US005109801A

United States Patent [19]

Gahagan

[11] Patent Number: 5,109,801

[45] Date of Patent: May 5, 1992

[54] ANIMAL RESTRAINT

[76] Inventor: Vicki S. Gahagan, 10439 Desmoines Memorial Dr., S., Seattle, Wash. 98168

[21] Appl. No.: 586,955

[22] Filed: Sep. 24, 1990

[51] Int. Cl.[5] .................... A01K 29/00

[52] U.S. Cl. .................... 119/96; 119/103; 128/873

[58] Field of Search .................... 119/96, 103, 101; 2/69.5; 128/873, 874; 5/494

[56] References Cited

U.S. PATENT DOCUMENTS

| | | | |
|---|---|---|---|
| 1,372,513 | 3/1921 | Juhl | 119/103 |
| 2,033,779 | 3/1936 | Monk | 5/494 |
| 2,530,606 | 11/1950 | Farringham | 123/873 |
| 2,766,751 | 10/1956 | Topa | 128/873 |
| 2,948,278 | 8/1960 | Topa | 128/873 |
| 3,361,132 | 1/1968 | Rentsch, Jr. | 128/873 |
| 3,547,079 | 12/1970 | Bassett | 119/1 |
| 3,739,751 | 6/1973 | Mohr et al. | 119/103 |
| 3,832,744 | 9/1974 | Krarup | 128/873 |
| 3,857,125 | 12/1974 | Hunt | 2/69.5 |
| 4,137,870 | 1/1977 | Cano | 119/96 |
| 4,742,821 | 5/1973 | Wootan | 128/873 |
| 4,796,567 | 1/1989 | Allan | 119/158 |

*Primary Examiner*—Paul J. Hirsch

*Attorney, Agent, or Firm*—Gregory W. Moravan

[57] ABSTRACT

An animal restraint for holding all of an animal's body, except for its head, while the animal is being examined, medicated or treated. The animal restraint comprises a sleeve of material having a large opening at one end and a smaller head opening at its other end. The animal restraint may include closures for the large opening and for the head opening. In addition, the animal restraint may include shoulder closures and hip closures for securely holding the animal with its legs folded comfortably beneath it, in order to help prevent the animal from struggling to escape. The animal restraint may be made from mesh material in order to permit the animal to be conveniently bathed, powdered or injected while inside of the animal restraint.

20 Claims, 1 Drawing Sheet

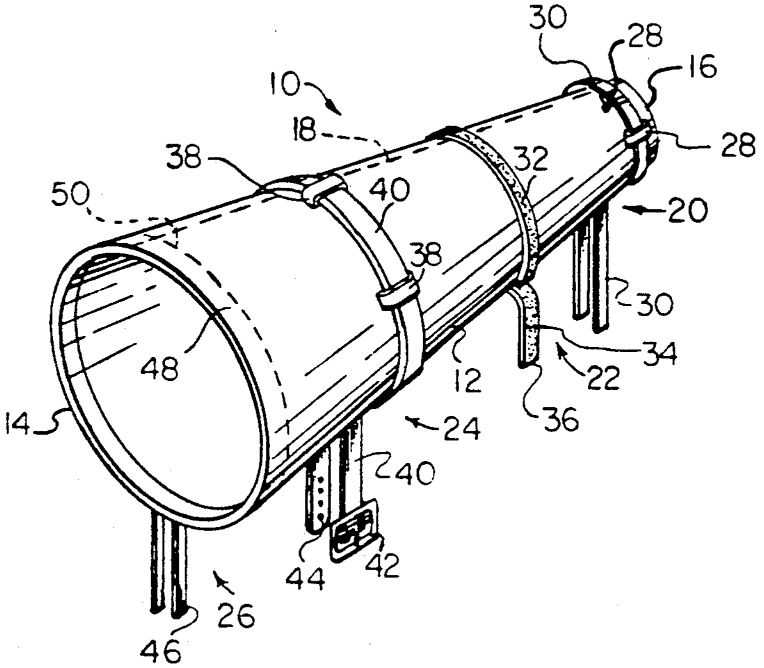
FIG. 1
FIG. 2
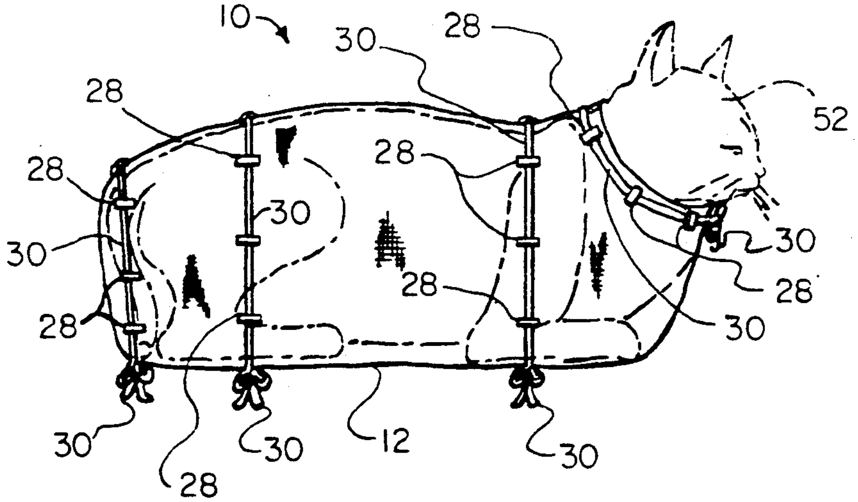

ANIMAL RESTRAINT

BACKGROUND OF THE INVENTION

The present invention relates to devices for restraining animals. More particularly, it relates to an animal restraint which can be used to temporarily restrain all of an animal's body, except for the animal's head.

SUMMARY OF THE INVENTION

Animals, such as cats and dogs, often need to be temporarily restrained, such as when they are being examined, medicated or treated. A conventional way to do this is to try to wrap the animal tightly up in a towel or blanket. However, this manner of restraining an animal has numerous disadvantages. This is because the animal frequently becomes very alarmed by the wrapping process itself, and thus struggles so hard to escape during the wrapping process that it becomes very difficult or even impossible to complete the wrapping process. In addition, even if a person is successful in initially wrapping the animal up, the animal's struggles for freedom will almost always result in the animal's eventual escape. This is because it is extremely difficult to hold a towel or blanket wrapped securely around a struggling animal even in the best of circumstances, much less while trying to examine, medicate or treat the animal at the same time.

In addition, under certain circumstances access is needed to the animal's body while it is being restrained, such as when it is desired to bathe, powder or administer an injection to the animal. However, the use of a towel or blanket to restrain an animal while any of these things are being done to it is quite difficult, or even impossible. This is because the towel or blanket would tend to cover the animal up, rather than expose it in the manner needed in order for any of these things to be done to it.

Thus, one of the objects of the present invention is to provide a relatively simple, low cost, easy to use animal restraint for quickly and safely restraining all of an animal's body, except for the animal's head, such as while the animal is being examined, medicated, treated, bathed, powdered or injected.

In basic form, the animal restraint of the present invention comprises a sleeve of material having a large opening at one end, and having a smaller, head opening at the other end. Thus, the animal restraint is quick, easy and simple to use since it is merely pulled over the animal until the animal's head protrudes through the head opening. The head opening is provided with closure means for securing the head opening about the animal's neck. The animal restraint can be made in several sizes, depending on the size of the animal with which it is intended to be used. The animal restraint can also be provided with closure means for its large opening, in order to keep the hind quarters of the animal within the animal restraint during use, and in order to prevent the animal restraint from riding up on the animal.

Another object of the present invention is to help to prevent the animal from using its legs or claws to try to escape from the animal restraint. To help achieve this object, the animal restraint may be provided with additional closure means which are located at the animal's shoulders and hips. When these closures are used, the animal's legs are gently, but firmly, held in a comfortable folded position beneath the animal, thereby safely preventing the animal from using its legs or claws to try to escape from the animal restraint.

As was mentioned earlier, under certain circumstances access is needed to the animal's body while it is being restrained, such as when it is desired to bathe, powder or administer an injection to the animal. If such is the case, then the animal restraint of the present invention is preferably made of a mesh material, in order to permit free access to the animal's body.

It should be understood that the foregoing is intended to be a brief, not an exhaustive, summary of the objects, features, advantages and characteristics of the present invention, since these and further objects, features, advantages and characteristics of the present invention will be directly or inherently disclosed to those skilled in the art to which it pertains by the following, more detailed description of the present invention.

BRIEF DESCRIPTION OF THE FIGURES

FIG. 1 is a perspective view of the animal restraint of the present invention which illustrates four different kinds of closure means; and FIG. 2 is a side elevational view of the animal restraint during use.

DESCRIPTION OF THE PREFERRED EMBODIMENTS

Turning now to FIG. 1, the animal restraint 10 of the present invention comprises a sleeve 12 having a large opening 14 at one end, and having a small head opening 16 at the other end. In general, the restraint's large opening 14 is sized at least large enough to permit the animal's body to enter the restraint 10; the central portion of the sleeve 12 is sized large enough to accommodate the body of the animal; and the restraint's head opening 16 is sized at least as large as the neck of the animal.

The sleeve 12 is formed from fabric by sewing it in any conventional way, such as by sewing it along the seam 18. The sleeve 12 can be made from any suitable tough, durable fabric, such as canvas. Preferably, the sleeve 12 is made from tightly woven fabric, in order to help prevent the animal from being injured by getting a claw accidentally stuck in the fabric, and in order to help prevent the animal from escaping from the restraint 10.

However, if the restraint 10 is to be used to restrain the animal while access is needed to the animal's body, such as when it is desired to bathe, powder or administer an injection to the animal, then it is preferred that the sleeve 12 be made from any suitable tough, durable mesh material, such as nylon mesh. This is an important feature of the present invention since the mesh material permits the animal to be bathed, powdered or injected through the mesh material while the animal is inside of the restraint 10. Naturally, when the sleeve 12 is made from mesh material, extra care must be taken in order to help prevent the animal's paws or claws from being accidentally caught in the mesh.

It is preferred, for sanitary reasons, that the sleeve 12 be made from fabric or mesh which is washable. However, non-washable fabric or mesh could be used, particularly if the restraint 10 is intended to be disposable.

A tapered, cone shaped sleeve 12 is preferred for ease of construction and to help keep the cost of restraint 10 to a minimum. However, it is understood that the sleeve 12 could be made in a variety of variations on a true cone shape. In addition, it is understood that the sleeve 12 might not be made in a cone shape at all, as long as it had a large opening 14 at one end, and had a small head opening 16 at its other end. However, regardless of the exact overall shape of the sleeve 12, the large opening 14 and the head opening 16 are preferably located at opposite ends of the sleeve 12.

Referring again to FIG. 1, four different kinds of conventional closures 20, 22, 24, 26 for the sleeve 12 are shown for purposes of illustration, each closure operating in the conventional way. However, it is to be understood that any other suitable kind of conventional closure, such as elastic, snaps, buttons, zippers or safety pins, could also be used with the sleeve 12. Normally, only one kind of closure would be used for any particular restraint 10; although more than one different kind of closure could be used, if desired.

The head opening closure 20 comprises several loops 28, which are spaced about the periphery of the head opening 16; and a tie 30 which is threaded through the loops 28, as seen.

The shoulder closure 22 is a velcro type closure which comprises two strips 32, 34 of conventional velcro material which releasably adhere to each other upon being pressed together. The strip 32 is affixed to the outer surface of the sleeve 12, as seen. The strip 34 has one end affixed to the outer surface of the sleeve 12 adjacent the upper end of the strip 32, while its other end 36 hangs free when not in use.

The hip closure 24 comprises several loops 38 which are spaced about the circumference of the sleeve 12; and a belt 40 which is threaded though the loops 38, as seen. The belt 40 has a buckle 42 and several belt holes 44.

The large opening closure 26 comprises a tie 46; and a tie sleeve 48 which is formed by folding over one end of the sleeve 12 and sewing it along the seam 50. The tie 46 is threaded through the tie sleeve 48, as seen.

For a restraint 10 of any given size, its closures 20, 22, 24, 26 offer the additional feature of permitting that particular restraint 10 to be used with a variety of sizes of animals, as long as the animal's body is not too large to fit inside of the sleeve 12, and as long as the head opening 16 is not too small for the animal's neck. In addition, the restraint 10 itself can be made in a variety of sizes, according to size of the particular animal it is designed to restrain.

It is to be noted that one or more, or even all, of the closures 20, 22, 24, 26 could be eliminated. This is particularly true if the sleeve 12 and the head opening 16 are sized to have a snug fit around the body of the animal to be restrained. However, the sleeve 12 is preferably provided with at least a head opening closure 20, to help prevent the animal from being inadvertently strangled, and to help hold the restraint 10 in place on the animal. Nevertheless, even the head opening closure 20 could be eliminated as long as the head opening 16 was at least as large as the animal's neck, and was too small for the animal's body to pass through it.

Referring now to FIG. 2, use of restraint 10 will now be described, it being noted that all of the closures 20, 22, 24, 26 which are shown in FIG. 2 are in the form of loops 28 and ties 30.

In order to use the restraint 10, the first thing which is done is to slip the restraint's large opening 14 over the animal's head and body. Preferably, the restraint's large opening 14 is sized considerably larger than the animal's body, so that the restraint 10 can be slipped over the animal's head and body very easily, thereby helping to avoid alarming the animal. Alternatively, the animal 52 could be inserted into the restraint 10 through its large opening 14.

An interesting thing then happens once the animal 52 is inside of the restraint 10. That is, the animal will then usually move forward within the restraint 10 and stick its head out through the head opening 16 voluntarily, apparently because it mistakenly perceives the head opening 16 as an avenue of escape. This is an important feature, since the animal's co-operation in its own capture makes using the restraint 10 much easier. In addition, the animal's co-operation results in less stress on the animal, the animal is less alarmed, and there is a reduced possibility of the animal injuring itself or the user during use of the restraint 10.

Naturally, if the animal 52 does not voluntarily stick its head out through the head opening 16, then the restraint 10 is slipped down over the animal's body until its head sticks out through the head opening 16.

Next, the head closure 20 is secured closely about the neck of animal 52, the user being careful not to secure the head closure 20 so tightly that the animal's comfortable breathing is interfered with. Then the large opening closure 26 is secured to hold the large opening 14 closed, so that the animal 52 is unable to back out of the restraint 10, and so that the restraint 10 will not ride up on the animal's body.

After this is done, the user then urges the animal 52 into the position shown in FIG. 2, with the animal's front and rear legs folded comfortably beneath it. Next, the shoulder closure 22 and the hip closure 24 are secured closely about the animal's shoulders and hips, respectively, to securely hold the animal in this position. When the animal is secured in this manner, the animal's legs and claws are effectively rendered inoperable, thereby making it very difficult, or even impossible, for the animal to use any of its legs or claws in an effort to escape. As a result, the animal is securely held by the restraint 10, thereby reducing the chance of any injury to the animal; and making it easy to examine, medicate or treat the animal. Similarly, if the sleeve 12 is made from mesh material as was described above, the animal can then be conveniently bathed, powdered, or injected while the animal is inside of the restraint 10—a very important feature of the present invention.

Although animals such as dogs and cats have been mentioned herein, it is understood that the restraint 10 could be sized and shaped to be usable with any other kind of animal.

Everything that has been described herein as being conventional is prior art with respect to the claimed invention. In addition, it is understood that the foregoing forms of the invention were described and/or illustrated strictly by way of non-limiting example.

In view of the foregoing, these and further modifications, adaptations and variations of the present invention will now be apparent to those skilled in the art to which it pertains, within the scope of the following claims.

What is claimed is:

1. An animal restraint for restraining an animal; wherein said animal comprises a body, a head, a neck, shoulders, front legs, hips, and rear legs; and wherein said animal restraint comprises a tapered, cone shaped, tubular sleeve of flexible material having a large end and a small end; wherein said sleeve is effectively continuous around its circumference and along its length; wherein said large end defines a large opening; wherein said small end defines a small, head opening; wherein said large opening is sized substantially larger than said animal's body to permit the easy entry and exit of said animal from said animal restraint; wherein said sleeve is sized larger than said animal's body to permit said animal's body to fit within said sleeve; and wherein said head opening is sized at least as large as said animal's head and neck to permit said animal's head and neck to pass therethrough; head opening closure means, located adjacent said head opening, for selectively adjusting the size of said head opening, and for releasably securing said animal restraint about said animal's neck; large opening closure means, located adjacent said large opening, for selectively adjusting the size of said large opening to be smaller than said animal's body, and for releasably keeping said animal within said animal restraint; shoulder closure means, located adjacent said animal's shoulders, for releasably holding said animal, when said animal is inside of said animal restraint, in a position wherein said animal's front legs are folded up, to help prevent said animal from using its said front legs to escape from said animal restraint; and hip closure means, located adjacent said animal's hips, for releasably holding said animal, when said animal is inside of said animal restraint, in a position wherein said animal's rear legs are folded up, to help prevent said animal from using its said rear legs to escape from said animal restraint; wherein said sleeve comprises mesh material means for permitting access to all of said animal's body through said mesh material means, wherein said access is sufficient to allow said animal to be bathed, powdered and injected through said mesh material means while said animal is inside of said animal restraint.

2. An animal restraint for restraining an animal; wherein said animal comprises a body, a head, a neck, shoulders, front legs, hips, and rear legs; and wherein said animal restraint comprises a sleeve; wherein said sleeve comprises flexible material; wherein said sleeve comprises two ends; wherein said sleeve defines a large opening in one of said ends and a small, head opening in the other of said ends; wherein said sleeve is effectively continuous around its circumference and along its length; wherein said large opening is sized to permit said animal to enter and exit said animal restraint; wherein said sleeve is sized to permit said animal's body to fit within said sleeve; and wherein said head opening is sized to permit said animal's head and neck to pass therethrough; head opening closure means, for releasably securing said animal restraint about said animal's neck; large opening closure means, for releasably closing said large opening enough to keep said animal within said animal restraint; shoulder closure means for releasably holding said animal, when said animal is inside of said animal restraint, in a position wherein said animal's front legs are folded up, to help prevent said animal from using its said front legs to escape from said animal restraint; and hip closure means for releasably holding said animal, when said animal is inside of said animal restraint, in a position wherein said animal's rear legs are folded up, to help prevent said animal from using its said rear legs to escape from said animal restraint.

3. The animal restraint according to claim 2, wherein said sleeve comprises mesh material means for permitting access to all of said animal's body through said mesh material means; wherein said access is sufficient to allow said animal to be bathed, powdered and injected through said mesh material means while said animal is inside of said animal restraint; wherein said sleeve is elongated and includes opposite ends; wherein said large opening and said smaller, head opening are located in respective ones of said opposite ends; and wherein said sleeve comprises a tapered, conical shape.

4. An animal restraint for restraining an animal; wherein said animal comprises a body, a head, a neck, shoulders, front legs, hips, and rear legs; and wherein said animal restraint comprises a sleeve; wherein said sleeve comprises flexible material; wherein said sleeve comprises two ends; wherein said sleeve defines a large opening in one of said ends and a small, head opening in the other of said ends; wherein said sleeve is effectively continuous around its circumference and along its length; wherein said large opening is sized to permit said animal to enter and exit said animal restraint; wherein said sleeve is sized to permit said animal's body to fit within said sleeve; and wherein said head opening is sized large enough to permit said animal's head and neck to pass therethrough.

5. The animal restraint according to claim 4, wherein said sleeve has a tapered, conical shape; wherein said animal restraint further comprises head opening closure means, for releasably securing said animal restraint about said animal's neck; shoulder closure means for releasably holding said animal, when said animal is inside of said animal restraint, in a position wherein said animal's front legs are folded up, to help prevent said animal from using its said front legs to escape from said animal restraint; and hip closure means for releasably holding said animal, when said animal is inside of said animal restraint, in a position wherein said animal's rear legs are folded up, to help prevent said animal from using its said rear legs to escape from said animal restraint; wherein said sleeve comprises mesh material means for permitting access to all of said animal's body through said mesh material means; and wherein said access is sufficient to allow said animal to be bathed, powdered and injected through said mesh material means while said animal is inside of said animal restraint.

6. The animal restraint according to claim 4, wherein said animal restraint further comprises head opening closure means, for releasably securing said animal restraint about said animal's neck; shoulder closure means for releasably holding said animal, when said animal is inside of said animal restraint, in a position wherein said animal's front legs are folded up, to help prevent said animal from using its said front legs to escape from said animal restraint; and hip closure means for releasably holding said animal, when said animal is inside of said animal restraint, in a position wherein said animal's rear legs are folded up, to help prevent said animal from using its said rear legs to escape from said animal restraint; wherein said sleeve comprises mesh material means for permitting access to all of said animal's body through said mesh material means; and wherein said access is sufficient to allow said animal to be bathed, powdered and injected through said mesh material means while said animal is inside of said animal restraint.

7. The animal restraint according to claim 4, wherein said sleeve has a tapered, conical shape; wherein said animal restraint further comprises head opening closure means, for releasably securing said animal restraint about said animal's neck; shoulder closure means for releasably holding said animal, when said animal is inside of said animal restraint, in a position wherein said animal's front legs are folded up, to help prevent said animal from using its said front legs to escape from said animal restraint; and hip closure means for releasably holding said animal, when said animal is inside of said animal restraint, in a position wherein said animal's rear legs are folded up, to help prevent said animal from using its said rear legs to escape from said animal restraint.

8. The animal restraint according to claim 4, wherein said animal restraint further comprises head opening closure means, for releasably securing said animal restraint about said animal's neck; shoulder closure means for releasably holding said animal, when said animal is inside of said animal restraint, in a position wherein said animal's front legs are folded up, to help prevent said animal from using its said front legs to escape from said animal restraint; and hip closure means for releasably holding said animal, when said animal is inside of said animal restraint, in a position wherein said animal's rear legs are folded up, to help prevent said animal from using its said rear legs to escape from said animal restraint.

9. The animal restraint according claim 4, wherein said sleeve has a tapered, conical shape; wherein said animal restraint further comprises shoulder closure means for releasably holding said animal, when said animal is inside of said animal restraint, in a position wherein said animal's front legs are folded up, to help prevent said animal from using its said front legs to escape from said animal restraint; and hip closure means for releasably holding said animal, when said animal is inside of said animal restraint, in a position wherein said animal's rear legs are folded up, to help prevent said animal from using its said rear legs to escape from said animal restraint; wherein said sleeve comprises mesh material means for permitting access to all of said animal's body through said mesh material means; and wherein said access is sufficient to allow said animal to be bathed, powdered and injected through said mesh material means while said animal is inside of said animal restraint.

10. The animal restraint according to claim 4, wherein said animal restraint further comprises shoulder closure means for releasably holding said animal, when said animal is inside of said animal restraint, in a position wherein said animal's front legs are folded up, to help prevent said animal from using its said front legs to escape from said animal restraint; and hip closure means for releasably holding said animal, when said animal is inside of said animal restraint, in a position wherein said animal's rear legs are folded up, to help prevent said animal from using its said rear legs to escape from said animal restraint; wherein said sleeve comprises mesh material means for permitting access to all of said animal's body through said mesh material means; and wherein said access is sufficient to allow said animal to be bathed, powdered and injected through said mesh material means while said animal is inside of said animal restraint.

11. The animal restraint according to claim 4, wherein said sleeve has a tapered, conical shape; wherein said animal restraint further comprises shoulder closure means for releasably holding said animal, when said animal is inside of said animal restraint, in a position wherein said animal's front legs are folded up, to help prevent said animal from using its said front legs to escape from said animal restraint; and hip closure means for releasably holding said animal, when said animal is inside of said animal restraint, in a position wherein said animal's rear legs are folded up, to help prevent said animal from using its said rear legs to escape from said animal restraint.

12. The animal restraint according to claim 4, wherein said animal restraint comprises shoulder closure means for releasably holding said animal, when said animal is inside of said animal restraint, in a position wherein said animal's front legs are folded up, to help prevent said animal from using its said front legs to escape from said animal restraint; and hip closure means for releasably holding said animal, when said animal is inside of said animal restraint, in a position wherein said animal's rear legs are folded up, to help prevent said animal from using its said rear legs to escape from said animal restraint.

13. The animal restraint according to claim 4, wherein said sleeve has a tapered, conical shape; wherein said animal restraint further comprises head opening closure means, for releasably securing said animal restraint about said animal's neck; wherein said sleeve comprises mesh material means for permitting access to all of said animal's body through said mesh material means; and wherein said access is sufficient to allow said animal to be bathed, powdered and injected through said mesh material means while said animal is inside of said animal restraint.

14. The animal restraint according to claim 4, wherein said animal restraint further comprises head opening closure means, for releasably securing said animal restraint about said animal's neck; wherein said sleeve comprises mesh material means for permitting access to all of said animal's body through said mesh material means; and wherein said access is sufficient to allow said animal to be bathed, powdered and injected through said mesh material means while said animal is inside of said animal restraint.

15. The animal restraint according to claim 4, wherein said sleeve has a tapered, conical shape; wherein said animal restraint further comprises head opening closure means, for releasably securing said animal restraint about said animal's neck.

16. The animal restraint accord into claim 4, wherein said sleeve has a tapered, conical shape; wherein said sleeve comprises mesh material means for permitting access to all of said animal's body through said mesh material means; and wherein said access is sufficient to allow said animal to be bathed, powdered and injected through said mesh material means while said animal is inside of said animal restraint.

17. The animal restraint according to claim 4, wherein said sleeve comprises mesh material means for permitting access to all of said animal's body through said mesh material means; and wherein said access is sufficient to allow said animal to be bathed, powdered and injected through said mesh material means while said animal is inside of said animal restraint.

18. The animal restraint according to claim 4, wherein said animal restraint further comprises head opening closure means, for releasably securing said animal restraint about said animal's neck.

19. The animal restraint according to claim 4, wherein said sleeve has a tapered, conical shape.

20. The animal restraint according to claim 4, wherein said animal restraint further comprises shoulder closure means for releasably holding said animal, when said animal is inside of said animal restraint, in a position wherein said animal's front legs are folded up, to help prevent said animal from using its said front legs to escape from said animal restraint.

* * * * *